United States Patent [19]
Tanaka et al.

[11] Patent Number: 4,576,988
[45] Date of Patent: Mar. 18, 1986

[54] SAPONIFIED PRODUCTS OF SILICON-CONTAINING ETHYLENE-VINYL ACETATE COPOLYMER AS MELT MOLDING MATERIALS

[75] Inventors: Yoshinari Tanaka; Akimasa Aoyama; Takeshi Moritani, all of Kurashiki; Kenji Satoh, Tondabayashi; Takuji Okaya, Nagaokakyo, all of Japan

[73] Assignee: Kuraray Co., Ltd., Kurashiki, Japan

[21] Appl. No.: 677,200

[22] Filed: Dec. 3, 1984

[30] Foreign Application Priority Data

Dec. 19, 1983 [JP] Japan ............................ 58-240759

[51] Int. Cl.[4] ................... C08L 29/04; C08F 8/00
[52] U.S. Cl. ................................. 524/503; 525/60; 526/279; 528/26; 428/447; 264/500
[58] Field of Search .............. 526/279; 528/26, 32; 525/60, 62, 326.5, 384; 524/503; 428/447; 264/500

[56] References Cited

U.S. PATENT DOCUMENTS

| 3,764,589 | 10/1973 | Bond, Jr. et al. | 260/80.71 |
| 4,097,436 | 6/1978 | Buning et al. | 260/29.6 H |
| 4,367,305 | 6/1983 | Satoh et al. | 524/398 |
| 4,478,990 | 10/1984 | Kohno et al. | 526/279 |

FOREIGN PATENT DOCUMENTS

| 0079003 | 5/1983 | Japan | 525/60 |
| 0164604 | 9/1983 | Japan | 525/60 |

Primary Examiner—Joseph L. Schofer
Assistant Examiner—Fred M. Teskin
Attorney, Agent, or Firm—Barry Kramer; Frederick H. Rabin

[57] ABSTRACT

A melt molding material which comprises a saponified product of a silicon-containing ethylene-vinyl acetate copolymer. When this melt molding material is formed into a sheet, said sheet is excellent in extensibility and thus suitable for deep forming. The decrease in gas barrier properties is small even under high moisture conditions, and its stress cracking resistance is excellent.

7 Claims, No Drawings

SAPONIFIED PRODUCTS OF SILICON-CONTAINING ETHYLENE-VINYL ACETATE COPOLYMER AS MELT MOLDING MATERIALS

BACKGROUND OF THE INVENTION

1. Field of the Invention

This invention relates to a melt molding material having excellent stress cracking resistance, polar solvent resistance and water resistance, also good gas barrier properties against oxygen etc. and excellent moldability, in particular, extensibility, which comprises a saponified product of a silicon-containing ethylene-vinyl acetate copolymer (hereinafter referred to as EVOH) and have been imparted with a wide range of properties suitable for various processing modes.

2. Description of the Prior Art

EVOH is a useful polymer material having high gas barrier properties and high transparency and also excellent in oil resistance and aroma-retaining properties, and is suitably and widely used in films, sheets, containers etc. However, EVOH lacks flexibility, although having great stiffness, and hence has a disadvantage that mechanical characteristics, for example, impact resistance etc., are low. On the other hand, since EVOH is susceptible to polar solvents, for example, alcohols such as methanol, ethanol etc. and also has great hygroscopicity, there are disadvantages, for example, physical properties such as flexibility, Young's modulus etc. of the molded product greatly fluctuate with the change in atmospheric moisture, temperature etc.; the moisture dependency of gas barrier properties is great and thus the gas barrier properties are reduced under high moisture conditions; further in a use where a molded product is directly contacted with any of the above-mentioned polar solvents, the molded product is swollen with the solvent, and in an extreme case, for example, when sterilization treated with hot water, etc., films, containers etc. undergo deformation, mutual adhesion etc., and so forth. Further, where EVOH molded bottles are contacted with certain types of surface active agents, polar solvents, agricultural chemical liquids etc., there is also a disadvantage that coupled with residual stress generated on molding, stress cracking is often caused.

It is an extremely important subject in practice to improve these various disadvantages. In order to offset said disadvantages, post-modification by a method of conducting a crosslinking operation on a molded product is imparted. For example, as a method of crosslinking plastic films, there is an electron radiating method applied to crosslinking of polyethylene films, but this method requires an expensive device and moreover requires strict control of the production conditions and therefore, with resins such as EVOH which are more easily decomposable and have a narrower molding temperature range as compared with the polyethylene films, there will be considerable difficulty in the materialization of this technique. Further, although various attempts have been made on the modification of EVOH resins for the purpose of improving said various disadvantages, no EVOH which has been uniformly modified without any spots and is free from these various disadvantages has yet been discovered. In other words, main attempts which have hitherto been made were to aim to impart a crosslinked structure to a part of EVOH by a post-modification method, and examples thereof include that which comprises treating EVOH with a boron compound (Japanese Patent Publication No. 20615/1974 Official Gazette), that which comprises reacting an organosilicon compound such as an organosilane compound, an organosiloxane compound etc. in the presence or absence of a peroxide and imparting a crosslinked structure to a part of EVOH in the presence of water or a silanol condensation catalyst (Japanese Patent Application Laid-open No. 20946/1976 Official Gazette, Japanese Patent Application Laid-open No. 53541/1976 Official Gazette, Japanese Patent Application Laid-open No. 20058/1979 Official Gazette etc.) etc. These prior art techniques have been inevitably still unsatisfactory in a respect that the uniformity of the degree of modification of EVOH is to be obtained, more specifically, for example, the localization of the crosslinked structure is to be avoided, seemingly owing to disadvantages due to that a boron compound or an organosilicon compound is added to EVOH to impart a crosslinked structure to a part of said resin, that is, the amount of said crosslinking agent added is considerably small and also due to that said addition, mixing and kneading and, further, reaction to and with the EVOH are by a post-modification method conducted in the conventional manner using various mixers, rolls, extruders, etc., and as a result, in molded products such as films, sheets, containers etc., although some improving effect is observed in various characteristics such as hot water resistance, humidity dependency of gas barrier properties, stress cracking resistance, polar solvent resistance etc., they have a drawback that their effects can not be sufficiently manifested due to the generation of localized spots in the molded products or there is a fluctuation in characteristics from product to product, and therefore, an improved EVOH having higher uniformity has been strongly desired.

Furthermore, Japanese Patent Application Laid-open No. 123189/1975 (corresponding to U.S. Pat. No. 4,097,436) discoloses that vinyl acetate and a vinylalkoxysilane are copolymerized and saponified to obtain a polyvinyl alcohol containing silicon, and that on that occasion, it is possible to replace a part (30–40 wt%) of the vinyl acetate by other components (ethylene etc.), but there is neither description regarding the silicon-containing EVOH having an ethylene content of 25–55 molar % nor description that it may be used as a melt molding material.

SUMMARY OF THE INVENTION

The present inventors have been intensively studying a silicon-containing EVOH obtained by saponifying a copolymer of vinyl acetate, ethylene and a specific silicon-containing olefinically unsaturated monomer, and, as a result, have surprisingly discovered a melt molding material which comprises an improved silicon-containing EVOH having an extremely high degree of uniformity, which has eliminated the above-described disadvantages, which is free from spots both from product to product and in molded products and hence free from a fluctuation in the above-described characteristics.

There has also been discovered a feature that where a material of this invention is coextruded with other thermoplastic resins etc. or where it is molded or deep-formed into a sheet, as compared with the conventional EVOH resins, the product of this invention does not easily gel, has better sheet moldability and is free from streak or stripe patterns, and when oriented by deep-forming etc., no cracking or stripe patterns are generated.

The melt molding material which comprises the EVOH according to this invention retains its excellent gas barrier properties, oil resistance, aroma-retaining properties and transparency, but its disadvantages, i.e., stress cracking resistance, humidity dependency of gas barrier properties, polar solvent resistance, water resistance, etc. have been alleviated, and also it is excellent in such properties as film and sheet moldability, extensibility, blow properties, deep-forming properties etc., and may be used for forming a composite with other thermoplastic resins for packaging containers for various foods, chemical, petroleum products etc., or can be used alone.

This invention provides a melt molding material which comprises EVOH obtained by saponifying a copolymer of vinyl acetate, ethylene and a specific olefinically unsaturated monomer containing silicon in the molecule. More specifically, this invention resides in a melt molding material which comprises a saponified product of a silicon-containing ethylene-vinyl acetate copolymer, having a degree of saponification of the vinyl acetate component of 95 molar % or more, an ethylene content of 25–55 molar % and a silicon content of 0.0005–0.2 molar %, which has been obtained by saponifying a copolymer of vinyl acetate, ethylene and one or more selected from silicon-containing olefinically unsaturated monomers of the general formulae (I), (II) and (III) given hereinbelow.

The melt molding material which comprises said EVOH in this invention is suitably that having an ethylene content of 25–55 molar %, preferably 25–50 molar %, and a degree of saponification of the vinyl acetate component in said copolymer of 95 molar % or more. If the ethylene content is less than 25 molar %, it is difficult to greatly enhance the effect to improve the stress cracking resistance, humidity dependency of gas barrier properties against oxygen etc. while retaining good melt moldability, whereas if the content exceeds 55 molar %, the barrier properties against oxygen etc. and aroma-retaining properties characteristic to the EVOH are lowered. Further, if the degree of saponification is less than 95 molar %, said barrier properties and oil resistance are lowered and therefore not only the inherent characteristics of the EVOH cannot be retained but also the effects of this invention cannot easily be imparted.

DETAILED DESCRIPTION OF THE PREFERRED EMBODIMENTS

As the olefinically unsaturated monomer containing silicon used in this invention, one or more selected from compounds of the following general formulae (I), (II) and (III) may be suitably employed:

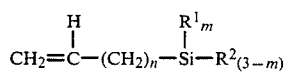 (I)

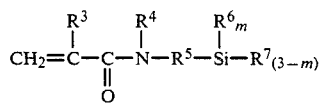 (II)

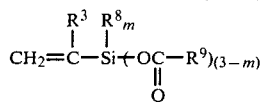 (III)

wherein n is 0–1, m is 0–2, $R^1$ is lower alkyl, aryl or lower alkyl having aryl, $R^2$ is a saturated branched or non-branched alkoxy of 1–40 carbon atoms, said alkoxy optionally having a substituent containing oxygen, $R^3$ is hydrogen or methyl, $R^4$ is hydrogen or lower alkyl, $R^5$ is alkylene or a divalent organic residue in which carbon atoms in the chain are connected with each other via oxygen or nitrogen, $R^6$ is hydrogen, halogen, lower alkyl, aryl or lower alkyl having aryl, $R^7$ is alkoxy or acyloxy wherein said alkoxy or acyloxy may optionally have a substituent containing oxygen or nitrogen, $R^8$ is hydrogen, halogen, lower alkyl, aryl or lowr alkyl having aryl, and $R^9$ is lower alkyl.

More specifically, $R^1$ represents lower alkyl of 1–5 carbon atoms, aryl of 6–18 carbon atoms or lower alkyl of 1–5 carbon atoms having aryl of 6–18 carbon atoms, $R^4$ represents hydrogen or lower alkyl of 1–5 carbon atoms, $R^5$ represents alkylene of 1–5 carbon atoms or a divalent organic residue in which carbon atoms in the chain are connected with each other via oxygen or nitrogen, $R^6$ represents hydrogen, halogen, lower alkoxy of 1–5 carbon atoms, aryl of 6–18 carbon atoms or lower alkyl of 1–5 carbon atoms having aryl of 6–18 carbon atoms, $R^7$ represents alkoxy or acyloxy of 1–40 carbon atoms wherein said alkoxy or acyloxy may optionally have a substituent containing oxygen or nitrogen, $R^8$ represents hydrogen, halogen, lower alkyl of 1–5 carbon atoms, aryl of 6–18 carbon atoms or lower alkyl of 1–5 carbon atoms having aryl of 6–18 carbon atoms, and $R^9$ represents lower alkyl of 1–5 carbon atoms.

Examples of the silicon-containing olefinically unsaturated monomer of the general formula (I) include vinyltrimethoxysilane, vinylmethyldimethoxysilane, vinyldimethylmethoxysilane, vinyltriethoxysilane, vinylmethyldiethoxysilane, vinyldimethylethoxysilane, aryltrimethoxysilane, arylmethyldimethoxysilane, aryldimethylmethoxysilane, aryltriethoxysilane, aryldimethylethoxysilane, vinyltris(β-methoxyethoxy)silane, vinylisobutyldimethoxysilane, vinylethyldimethoxysilane, vinylmethoxydibutoxysilane, vinyldimethoxybutoxysilane, vinyltributoxysilane, vinylmethoxydihexyloxysilane, vinyldimethoxyhexyloxysilane, vinyltrihexyloxysilane, vinylmethoxydioctyloxysilane, vinyldimethoxyoctyloxysilane, vinyltrioctyloxysilane, vinylmethoxydilauryloxysilane, vinyldimethoxylauryloxysilane, vinylmethoxydioleyloxysilane, vinyldimethoxyoleyloxysilane, polyethylene glycol derivatives of vinylmethoxysilanes of the general formula:

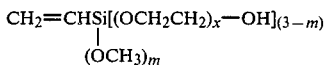

wherein m is as defined above and x represents 1–20, etc. Of those, vinyltrimethoxysilane is preferred from an economical viewpoint.

Examples of the silicon-containing olefinically unsaturated monomer of the general formula (II) include:
(meth)acylamido-straight-chain or branched-chain alkyltrialkoxysilanes such as 3-(meth)acrylamido-propyltrimethoxysilane $$CH_2=CRCNH(CH_2)_3Si(OCH_3)_3$$
$$\parallel$$
$$O$$

3-(meth)acrylamido-propyltriethoxysilane $$CH_2=CRCNH(CH_2)_3Si(OCH_2CH_3)_3$$
$$\parallel$$
$$O$$

3-(meth)acrylamido-propyltri($\beta$-methoxyethoxy)silane $$CH_2=CRCNH(CH_2)_3Si(OCH_2CH_2OCH_3)_3$$
$$\parallel$$
$$O$$

3-(meth)acrylamido-propyltri(N—methylaminoethoxy)silane $$CH_2=CRCNH(CH_2)_3Si(OCH_2CH_2NHCH_3)_3$$
$$\parallel$$
$$O$$

2-(meth)acrylamido-ethyltrimethoxysilane $$CH_2=CRCNH(CH_2)_2Si(OCH_3)_3$$
$$\parallel$$
$$O$$

1-(meth)acrylamido-methyltrimethoxysilane $$CH_2=CRCNHCH_2Si(OCH_3)_3$$
$$\parallel$$
$$O$$

2-(meth)acrylamido-2-methylpropyltrimethoxysilane $$\begin{array}{c} CH_3 \\ | \\ CH_2=CRCNHCCH_2Si(OCH_3)_3 \\ \parallel \quad | \\ O \quad CH_3 \end{array}$$

2-(meth)acrylamido-isopropyltrimethoxysilane $$\begin{array}{c} CH_2=CRCNHCHCH_2Si(OCH_3)_3 \\ \parallel \quad | \\ O \quad CH_3 \end{array}$$

wherein R represents hydrogen or methyl, etc.;
(meth)acrylamido-nitrogen-containing or oxygen-containing alkyltrialkoxysilanes such as
N-(2-(meth)acrylamido-ethyl)-aminopropyltrimethoxysilane $$CH_2=CRCONHCH_2CH_2NH(CH_2)_3Si(OCH_3)_3$$

(3-(meth)acrylamido-propyl)-oxypropyltrimethoxysilane $$CH_2=CRCONH(CH_2)_3O(CH_2)_3Si(OCH_3)_3$$

wherein R represents hydrogen or methyl, etc.;
(meth)acrylamido-alkyltriacyloxysilanes such as
3-(meth)acrylamido-propyltriacetoxysilane $$CH_2=CRCONH(CH_2)_3Si(OCOCH_3)_3$$

2-(meth)acrylamido-ethyltriacetoxysilane $$CH_2=CRCONH(CH_2)_2Si(OCOCH_3)_3$$

4-(meth)acrylamido-butyltriacetoxysilane $$CH_2=CRCONH(CH_2)_4Si(OCOCH_3)_3$$

3-(meth)acrylamido-propyltripropionyloxysilane $$CH_2=CRCONH(CH_2)_3Si(OCOCH_2CH_3)_3$$

2-(meth)acrylamido-2-methylpropyltriacetoxysilane $$\begin{array}{c} CH_3 \\ | \\ CH_2=CRCONHCCH_2Si(OCOCH_3)_3 \\ | \\ CH_3 \end{array}$$

N-(2-(meth)acrylamido-ethyl)aminopropyltriacetoxysilane $$CH_2=CRCONHCH_2CH_2NH(CH_2)_3Si(OCOCH_3)_3$$

wherein R is hydrogen or methyl, etc.;
(meth)acrylamido-alkyldi- or monoalkoxy- or di- or monoacyloxysilanes such as 3-(meth)acrylamido-propylisobutyldimethoxysilane
$$\begin{array}{c} CH_2=CRCONH(CH_2)_3Si(OCH_3)_2 \\ | \\ CH_3CHCH_2CH_3 \end{array}$$

2-(meth)acrylamido-ethyldimethylmethoxysilane $$\begin{array}{c} CH_3 \\ | \\ CH_2=CRCONH(CH_2)_2SiOCH_3 \\ | \\ CH_3 \end{array}$$

3-(meth)acrylamido-propyloctyldiacetoxysilane $$\begin{array}{c} CH_2=CRCONH(CH_2)_3Si(OCOCH_3)_2 \\ | \\ (CH_2)_7CH_3 \end{array}$$

1-(meth)acrylamido-methylphenyldiacetoxysilane $$\begin{array}{c} CH_2=CRCONHCH_2Si(OCOCH_3)_2 \\ | \\ C_6H_5 \end{array}$$

3-(meth)acrylamido-propylbenzyldiethoxysilane $$\begin{array}{c} CH_2=CRCONH(CH_2)_3Si(OCH_2CH_3)_2 \\ | \\ CH_2-C_6H_5 \end{array}$$

2-(meth)acrylamido-2-methylpropylmonochlorodimethoxysilane $$\begin{array}{c} CH_2=CRCONHC(CH_3)_2CH_2Si(OCH_3)_2 \\ | \\ Cl \end{array}$$

2-(meth)acrylamido-2-methylpropylhydrogenmethoxysilane $$\begin{array}{c} CH_3 \\ | \\ CH_2=CRCONHCCH_2Si(OCH_3)_2 \\ | \quad | \\ CH_3 \quad H \end{array}$$

wherein R represents hydrogen or methyl, etc.;
(N-alkyl-(meth)acrylamido)-alkyltrialkoxy- or triacetoxysilanes such as 3-(N—methyl-(meth)acrylamido)-propyltrimethoxysilane $$\begin{array}{c} CH_2=CRCON(CH_2)_3Si(OCH_3)_3 \\ | \\ CH_3 \end{array}$$

2-(N—ethyl-(meth)acrylamido)-ethyltriacetoxysilane $$CH_2=CRCONCH_2CH_2Si(OCOCH_3)_3$$
$$\quad\quad\quad\quad | $$
$$\quad\quad\quad\quad CH_2CH_3$$

wherein R represents hydrogen or methyl, etc.; and so forth. Of those, 3-(meth)acrylamido-propyltrimethoxysilane and 3-(meth)acrylamido-propyltriacetoxysilane are preferably employed in a respect that their industrial production is relatively easy and inexpensive, and 2-(meth)acrylamido-2-methylpropyltrimethoxysilane and 2-(meth)acrylamido-2-methylpropyltriacetoxysilane in a respect that the amido bond is remarkably stable against acid and alkali. Here, the modified silicon-containing EVOH obtained by copolymerizing a silicon-containing polymeric monomer of the general formula (II) with vinyl acetate and ethylene and then saponifying the obtained copolymer contains a copolymerization unit of the following general formula (IV):

$$-(CH_2-CR^3)-\quad\quad R^6{}_m \quad\quad (IV)$$
$$\quad\quad | \quad\quad\quad\quad\quad | $$
$$\quad\quad CON-R^5-Si-R^{10}{}_{(3-m)}$$
$$\quad\quad\quad | $$
$$\quad\quad\quad R^4$$

wherein $R^3$, $R^4$, $R^5$, $R^6$ and m are as defined above, and $R^{10}$ represents hydroxyl or a salt of hydroxyl of the general formula OM wherein M is an alkali metal or $NH_4$.

Examples of the silicon-containing olefinically unsaturated monomer of the general formula (III) include:

vinyltriacetoxysilane $$CH_2=CHSi(OCCH_3)_3$$
$$\quad\quad\quad\quad ||$$
$$\quad\quad\quad\quad O$$

vinyltripropionyloxysilane $$CH_2=CHSi(OCCH_2CH_3)_3$$
$$\quad\quad\quad\quad ||$$
$$\quad\quad\quad\quad O$$

isopropenyltriacetoxysilane $$\quad\quad CH_3$$
$$\quad\quad | $$
$$CH_2=CSi(OCCH_3)_2$$
$$\quad\quad\quad\quad ||$$
$$\quad\quad\quad\quad O$$

vinylisobutyldiacetoxysilane $$CH_2=CHSi(OCOCH_3)_2$$
$$\quad\quad\quad | $$
$$\quad\quad\quad CH_3CHCH_3$$

vinylmethyldiacetoxysilane $$CH_2=CHSi(OCOCH_3)_2$$
$$\quad\quad\quad | $$
$$\quad\quad\quad CH_3$$

vinyldimethylacetoxysilane $$\quad\quad\quad CH_3$$
$$\quad\quad\quad | $$
$$CH_2=CHSiOCCH_3$$
$$\quad\quad\quad | \quad ||$$
$$\quad\quad\quad | \quad O$$
$$\quad\quad\quad CH_3$$

vinylphenyldiacetoxysilane $$CH_2=CHSi(OCCH_3)_2$$
$$\quad\quad\quad | \quad ||$$
$$\quad\quad\quad | \quad O$$
$$\quad\quad\quad C_6H_5$$

vinylmonochlorodiacetoxysilane $$CH_2=CHSi(OCCH_3)_2$$
$$\quad\quad\quad | \quad ||$$
$$\quad\quad\quad Cl \quad O$$

vinylmonohydrogendiacetoxysilane $$CH_2=CHSi(OCCH_3)_2$$
$$\quad\quad\quad | \quad ||$$
$$\quad\quad\quad H \quad O$$

and so forth, but vinyltriacetoxysilane is preferred from an economical standpoint.

The copolymerization of the above-described silicon-containing olefinically unsaturated monomer with vinyl acetate and ethylene is preferably conducted by the solution polymerization in the presence of an alcohol. As the alcohol, in general, a lower alcohol such as methanol, ethanol etc. is preferred in an industrial point of view. The copolymerization may be conducted either batchwise or in a continuous mode. The ethylene content of EVOH is determined mainly by the amount of the vinyl acetate present in the copolymerization system and the ethylene present in solution in said system, and the latter depends mainly on the polymerization ethylene pressure, temperature etc., and therefore, where the ethylene content is the same, the silicon content in the modified EVOH is dominated by the balance in amount between the vinyl acetate and the silicon-containing olefinically unsaturated monomer present in said system. In the batchwise case, while it is well known that the degree of polymerization as well as the composition of the copolymer undergo changes with the ratio of the copolymerization reactivity, it is more desired to employ a semi-batch mode, i.e., to add either or both monomers so as to keep the monomer composition constant, in order to obtain a copolymer having a uniform copolymerization composition. As an example of the calculation for the amounts to be added in such a case, the equation presented by R. J. Hanna in Industrial and Enginerring Chemistry Vol. 49, No. 2, 208–209 (1957) may be quoted. In the continuous mode, a complete mixing type one-stage fluid system reaction mode in which a stirring mixing vessel is used as a copolymerization reactor is most suitable, and in the case of said fluid system reaction mode but using two or more stages, i.e. multi-stage reaction mode, it is more preferred to conduct the reaction while adding the monomer or monomers to said reactor in the second or later stage for the same reason as described above. Examples of the polymerization initiator which may be used include known radical initiators, for example, nitriles such as 2,2'-azobis(4-methoxy-2,4-dimethylvaleronitrile), 2,4,4-trimethylvaleronitrile, 2,2'-azobisisobutyronitile etc., carbonates such as di-n-propyl peroxycarbonate, bis-4-t-butylcyclohexyl peroxydicarbonate, bis-2-ethylhexyl peroxydicarbonate etc., peroxides such as acetylcyclohexanesulfonyl peroxide, benzoyl peroxide, lauroyl peroxide etc., and the like. Of those, polymerization initiators having a shorter half-life are suitably used for long-term continuous operations in a respect that they can almost completely or greatly inhibit the generation of gels insoluble in the polymerization system otherwise observed with time in the course of copolymerization.

The copolymer obtained by the copolymerization is then subjected to a saponification reaction. The saponification reaction is advantageously conducted in the conventional manner using an alkaline catalyst, that is, generally by conducting said copolymerization in an alcohol solvent by alcoholysis, and, in particular, a method of conducting the saponification while removing by-produced methyl acetate during the saponification from the column top by blowing an alcohol vapor into the column bottom using a column reactor disclosed in Japanese Pat. Nos. 575,889 and 611,557 may be most suitably employed.

Examples of the alkaline catalyst used in the saponification reaction include hydroxides of alkali metals such as sodium hydroxide, potassium hydroxide etc., alcoholates such as sodium methylate, potassium methylate etc. Of those, sodium hydroxide is industrially advantageous from an economical viewpoint. Especially, where the aforesaid column reactor is used, a temperature of 100° C. or higher is suitable taking into consideration the cut in reaction time, the solubility of said silicon-containing EVOH in alcohol etc., although also depending on the composition of said copolymer.

In the saponification reaction, the vinylalkoxysilane unit is also saponified to a high extent and converted into a vinylsilanol unit, an alkali salt thereof or a mutual condensate thereof. However, said copolymer containing the monomer of the above-mentioned general formula (II) is stably retained without the decomposition of the amide bond in the silicon-containing polymeric monomer unit in the saponification using an alkaline catalyst. However, on the saponification reaction, the alkoxy group, carboxyl group, hydrogen and halogen connected to the silicon in the silicon-containing monomer unit of the general formula (II) are simultaneously saponified either partially or to a great extent and thus are converted into hydroxyl groups or alkali salts of the hydroxyl groups. Further, a part of these hydroxyl groups may form siloxane bonds by connecting these reactive groups by appropriate drying conditions when the modified EVOH molding material obtained after the saponification reaction is dried. Since said modified EVOH molding material in which siloxane bonds have been formed to a considerable extent sometimes exhibits deterioration in heat melt properties, in such a case, it is preferred to control the content of the silicon-containing monomer or to make a modified EVOH molding material having a (meth)acrylamido-branched-chain alkylsilane unit remarkably stable against alkali as the silicon-containing polymer monomer unit.

After the saponification reaction, on isolating the modified EVOH molding material, while any conventional method may be used, in particular, a method disclosed in Japanese Pat. No. 725,520, which comprises causing deposition in a strand form and separating said polymer is suitably employed. Said deposited and isolated EVOH molding material is washed with water in the conventional manner, subjected to known heat stabilizing treatment such as acid treatment, and dried. On said acid treatment, the alkali salts of the hydroxyl groups converted from the alkoxy group, carboxyl group, hydrogen and halogen connected to the silicon at the time of saponification reaction are now hydrolyzed to hydroxyl groups.

Another object of this invention is to impart a wide range of characteristics suitable for various processing modes. As described above, EVOH is widely used in food packaging containers etc. as a thermoplastic resin having excellent gas barrier properties, but it is more often used in practice by making a composite with other hydrophobic resins rather than used as a single resin. As the method of making a composite, coextrusion, lamination, blending etc. may be conducted. On that occasion, various processing modes are conducted depending on the combination with various resins, but it was difficult with the conventional EVOH resins to impart a wide range of characteristics suitable for various processing modes. For example, taking the melt viscosity characteristics as an example, a resin having a high zero shear viscosity, a resin having high shear rate dependency of viscosity, a resin having high temperature dependency of viscosity, etc. have hitherto been not satisfactorily obtained, and for that reason, there has been a problem that coextrusion molding is difficult because the flow characteristics of the resin are not compatible with those of extrusion grade resins such as high density polyethylene, polyvinyl chloride, thermoplastic polyesters, polystyrene etc. As a solution for said problem, a post-modification method which comprises subsequently adding a crosslinking agent such as those described above has hitherto been attempted. Even in such a case, however, the approach was unsatisfactory regarding the uniformity of modification of the EVOH resin.

The modified silicon-containing EVOH molding material according to this invention is quite satisfactory from such aspects as the improvement of the characteristics inherent to the EVOH resin, the impartation of characteristics suitable for other various resins and various processing modes, etc. and it is possible to obtain said modified EVOH melt molding material suitable for each case according to the purpose by changing the content of the silicon-containing monomer in said copolymer. For example, the melt index of EVOH increases with the increase in the ethylene content, and where other resin having a low melt index is to be used to make a composite with EVOH, since a phenomenon of melt viscosity incompatibility is frequently encountered due to the difference in the melt viscosity, but even in such a case, by using said modified EVOH resin molding material in which the melt index of the EVOH resin has been lowered by the modification featured by this invention while said composition is retained, said melt viscosity imcompatibility can be solved. Thus, the utility of the modified EVOH molding material of this invention is extremely great coupled with the uniformity of modification. It the content of said silicon-containing monomer is too low, the effect of the modification is not remarkably manifested, whereas if too much, the degree of crosslinking is too increased and heat unmeltability is manifested. While said content is selected depending on each purpose, a range of 0.0005–0.2 molar % is suitably used, preferably 0.001–0.1 molar %. The silicon content as herein used means the amount (molar %) of the silicon-containing monomer in the silicon-containing monomer-vinyl acetate-ethylene copolymer.

While, as described above, the modified silicon-containing EVOH resin of this invention may be more satisfactorily used for the entire range of the conventional use purposes, newly imparted characteristics due resulting from by the inclusion of silicon, for example, the improvement of the adhesion with e.g. aluminum foil, other resins etc. may be advantageously used.

The melt index as measured by ASTM D-1238-T of the modified EVOH melt molding material of this invention is suitably 0.05–10 g/10 minutes at 190° C. under a load of 2,160 g, and, in particular, that having a melt index of 0.1–10 g/10 min is preferably employed in various uses such as films, sheets, containers, either as such without orientation or after at least monoaxially oriented.

While the melt molding material which comprises a silicon-containing EVOH of this invention is that which comprises an EVOH having specific ethylene content and silicon content obtained by saponifying a copolymer of vinyl acetate, ethylene and the above-described specific silicon-containing olefinically unsaturated monomer, said copolymer may contain a third substance as a copolymerizable component as long as the characteristics of said melt molding material are not adversely influenced. Examples of said third substance include α-olefins of 3 or more carbon atoms, acrylic acid, methacrylic acid and esters of these acids, etc.

As described above, the melt molding material of this invention may be used either singly or by making a composite with other resins, but it is more preferably used as a two or more layered, i.e., multi-layered laminated structure by combining with other various resins in order to satisfy the demand for the expansion in variety and the upgrading to better quality of the characteristics required especially in the recent years. On making a composite, a method such as coextrusion, biaxial orientation, blow molding etc. are employed, and in this case, it is possible to select the silicon content in the melt molding material of this invention to obtain a desired EVOH having the desired ethylene content which does not cause melt viscosity incompatibility with other thermoplastic resins. Examples of the layer constitution of said laminate include polyethylene /adhesive layer/ EVOH of this invention (hereinafter referred to as Si-EVOH), polyethylene /adhesive layer/ Si-EVOH /adhesive layer/ polyethylene (hereinafter referred to as PE), polypropylene (hereinafter referred to as PP) /adhesive layer /Si-EVOH, PP /adhesive layer/ Si-EVOH /adhesive layer/ PP, PP /adhesive layer/ Si-EVOH /adhesive layer/ PE, thermoplastic polyester (hereinafter referred to as PET) /adhesive layer/ Si-EVOH, PET /adhesive layer/ Si-EVOH /adhesive layer/ PET, PET /adhesive layer/ Si-EVOH /adhesive layer/ PP, PET /adhesive layer/ Si-EVOH /adhesive layer/ PE, polystyrene (hereinafter referred to as PS) /adhesive layer/ Si-EVOH, PS /adhesive layer/ Si-EVOH /adhesive layer/ PS etc. Further, the use of Si-EVOH coated with vinylidene chloride, the use of a laminate obtained from said coated composite by further laminating other resin, etc. are also preferred embodiments. The adhesive resin used in the adhesive layer, although varying depending on the kind of the resin to be laminiated adjacent to Si-EVOH, may be selected from, for example, maleic anhydride graft modified PE, maleic anhydride graft modified PP, maleic anhydride graft modified ethylene-ethyl acrylate, ethylene-vinyl acetate copolymers, maleic anhydride graft modified ethylene-vinyl acetate copolymers, mixtures of two or more thereof, blends of those with Si-EVOH, etc.

On commercializing said laminated structure into e.g. containers, it is economically important to reuse scrap and rejected products of said laminate generated on molding, and it is possible to use a blend of Si-EVOH with other resin to be laminated and/or an adhesive either singly or by laminating with Si-EVOH or other thermoplastic resin.

The effect of this invention, more specifically, for example, the effect to enhance the stress cracking resistance, may be made clear by conducting a cracking resistance test as described in the examples by impregnating with an agricultural chemical liquid preparation or the like which causes stress cracking, and thus the modifying effect of this invention is remarkable. Further, the effect to improve the decrease in barrier properties against oxygen due to moisture absorption will be evident by the measurement of e.g. oxygen permeability constant, which is more or less comparable to said permeability constant of the unmodified EVOH under low moisture conditions, but the decrease of which under higher moisture conditions is apparent, and thus the effect of this invention to improve said barrier properties is remarkable.

This invention is more particularly described by the following examples, but it will be understood that this invention is not restricted to these examples. In the examples, all the parts and % are parts by weight and % by weight respectively unless otherwise specified.

EXAMPLE 1

Using a 10-liter polymerization vessel with a stirrer and equipped with a built-in cooling coil, continuous polymerization was conducted by the following conditions in order to obtain a silicon-containing ethylene-vinyl acetate copolymer.

| | |
|---|---|
| Feeding rate of vinyl acetate | 480 g/hr |
| Feeding rate of methanol | 40 g/hr |
| Feeding rate of vinyltrimethoxysilane | 355 mg/hr |
| 2,2'-Azobisisobutyronitrile | 33 mg/hr |
| Polymerization temperature | 77° C. |
| Polymerization vessel ethylene pressure | 60 kg/cm$^2$G |
| Average residence time | 6 hrs |

The degree of polymerization of the vinyl acetate was about 50%. Said copolymerization reaction mixture was fed to an expelling column, the unreacted vinyl acetate was removed from the column top by introducing a methanol vapor from the column lower part, thereby a 45% methanol solution of said copolymer was obtained. Said copolymer was confirmed by NMR analysis to obtain 0.027 molar % of the vinyltrimethoxysilane unit, 59.5 molar % of the vinyl acetate unit and about 40.5 molar % of the ethylene unit. The methanol solution of said copolymer was introduced into a column type saponification reactor, and the saponification reaction was conducted by further feeding sodium hydroxide to said reactor so that the molar ratio thereof to the vinyl acetate component contained in said copolymer be 0.05, while blowing a methanol vapor from the column lower part and removing by-produced methyl acetate from the column top, thereby a methanol solution of a modified EVOH was obtained from the column bottom. A mixed vapor of methanol/water=7/3 in weight ratio was blown into said methanol solution to change the solvent composition in said solution into a mixed system of water/methanol, after which the solution was ejected into a 10% methanol aqueous solution at 5° C. in a strand form to solidify and deposit, then cut, and said EVOH was isolated as pellets. This was then washed thoroughly with water, dipped in dilute aqueous acetic acid, and dried at 65°-110° C. The degree of saponification was 99.3 molar %.

Said EVOH was fed to an extruder, melted and formed into a film at a die temperature of 210° C. to obtain a film of 20μ in thickness. The oxygen permeability constant was measured and set forth in Table 1 together with other characteristics values of said EVOH.

TABLE 1

| | Modified EVOH Pellets | | | Oxygen Permeability Constant (cc · cm/ cm$^2$ · sec cmHg) | |
|---|---|---|---|---|---|
| | [η]ph*$^1$ (1/g) | MI$_{190}$*$^2$ (g/10 min) | Acetic Acid Content (%) | 0% RH (35° C.) | 100% RH (20° C.) |
| Example 1 | 0.084 | 2.1 | 0.032 | 3.2 × 10$^{-14}$ | 8.9 × 10$^{-14}$ |
| Comparative Example 1 | 0.081 | 16.5 | 0.034 | 3.1 × 10$^{-14}$ | 4.3 × 10$^{-13}$ |

*$^1$Measured in a 15% aqueous phenol at 30° C.
*$^2$Melt Index value measured at 190° C. under a load of 2,160 g.

COMPARATIVE EXAMPLE 1

The procedures of Example 1 were repeated except that the vinyltrimethoxysilane was not used to obtain an EVOH having an ethylene content of 40.7 molar % and a degree of saponification of 99.4 molar %. This was melted and formed into a film in a manner similar to that in Example 1 to obtain a film of 20μ in thickness, and the oxygen permeability constant was measured. The results are shown in Table 1.

EXAMPLES 2–4 AND COMPARATIVE EXAMPLES 2–4

Using the same polymerization vessel as in Example 1, continuous polymerization was conducted by the following conditions:

| | |
|---|---|
| Feeding rate of vinyl acetate | 440 g/hr |
| Feeding rate of t-butanol | 60 g/hr |
| 2,2'-Azobis(2,4-dimethylvaleronitrile) | 110 mg/hr |
| 3-Acrylamido-propyltrimethoxysilane | 150 mg/hr |
| Polymerization temperature | 60° C. |
| Average residence time | 8 hrs |
| Polymerization vessel ethylene pressure | 46 kg/cm$^2$G |

The degree of polymerization of the vinyl acetate was about 55%. Said copolymer was confirmed by NMR analysis to contain 0.013 molar % of the 3-acrylamido-propyltrimethoxysilane unit, 65 molar % of the vinyl acetate unit and about 35 molar % of the ethylene unit.

In a manner similar to that in Example 1, this was saponified and isolated, then post-treated and dried to obtain a modified EVOH. The degree of saponification was 99.2 molar %, and the MI$_{190}$ was 0.7 g/10 min.

A high density polyethylene (MI$_{190}$: 0.3 g/10 min) was fed to an outer layer, said modified EVOH resin to an inner layer, and a modified polyolefin (trade name: Modic produced by Mitsubishi Petro-Chemical Co., Ltd.) to an intermediate layer. The respective extruders were set at temperatures of 160°-200° C. for the outer and intermediate layers and 180°-210° C. for the inner layer, and their top ends were connected to a three-layered head. The die extrusion was conducted at 220° C. The respective resins were firmly bonded in the die, extruded as a three-layered cocentric parison, and subjected to biaxial orientation blow molding. The capacity of each container was about 500 ml, and each layer thickness was about 0.81 mm for the outer layer, 10μ for the inner layer and 50-350μ for the inner layer. Said container was tested for the cracking resistance as follows:

Containers filled with 450 ml of the agricultural chemical liquid preparation to be tested were subjected to 3 cycles, each cycle consisting of warming at 40° C. for 30 days, standing at normal temperature for a day and further standing at −20° C. for 3 days, and thereafter they were examined for the presence of cracking generated during that time. The cracking resistance was expressed as the number of samples which showed no generation of cracking when 20 samples were tested. The results are shown in Table 2.

Further, similar containers obtained in a manner similar to that in Example 2 except that the 3-acrylamido-propyltrimethoxysilane was not used were also tested for the cracking resistance, and the results are also shown in Table 2.

The degree of saponification of this EVOH was 99.3 molar %, and the MI$_{190}$ was 2.1 g/10 min.

TABLE 2

| | Inner Layer Thickness (μ) | Filled Liquid Preparation | Cracking Resistance |
|---|---|---|---|
| Example 2 | 105 | DDVP emulsion | 20 |
| Example 3 | 85 | Estox emulsion | 20 |
| Example 4 | 320 | Hinosan emulsion | 20 |
| Comparative Example 2 | 350 | DDVP emulsion | 2 |
| Comparative Example 3 | 152 | Estox emulsion | 3 |
| Comparative Example 4 | 95 | Hinosan emulsion | 2 |
| Example 5 | 125 | DDVP emulsion | 20 |
| Example 6 | 80 | Estox emulsion | 20 |
| Example 7 | 250 | Hinosan emulsion | 20 |

EXAMPLES 5–8 AND COMPARATIVE EXAMPLES 5–7

The procedures of Example 2 were repeated except that the amount of the 3-acrylamido-propyltrimethoxysilane used as the silicon-containing monomer in Example 2 was changed to 290 mg/hr to obtain hollow containers of a capacity of about 500 ml, having an outer layer of a high density polyethylene (MI$_{190}$: 0.3 g/10 min), an intermediate layer of the aforesaid modified polyethylene and an inner layer of said modified EVOH and having a thickness of 0.8 mm for the outer layer and 11μ for the intermediate layer. It was confirmed by NMR analysis that said copolymer contained 0.02 molar % of the 3-acrylamidopropyltriacetoxysilane unit and its vinyl acetate and ethylene contents were comparable to those in Example 2. Said hollow containers were tested similarly for the cracking resistance. The results are shown in Table 3. The degree of saponification of said EVOH was 99.5 molar %, and the MI$_{190}$ was 0.3 g/10 min.

Further, said modified EVOH was fed to the extruder and a film of 20μ in thickness was obtained as in Example 1. Its oxygen permeability constant was measured. The results are shown in Table 4.

Furthermore, hollow containers obtained similarly but excluding said silicon-containing monomer were tested for the cracking resistance, and the results are shown in Table 3. The oxygen permeability constant of the film was shown in Table 4. In this case, the degree of saponification of the EVOH was 99.4 molar %, and the MI$_{190}$ was 2.15 g/10 min.

TABLE 3

| | Inner Layer Thickness (μ) | Filled Liquid Preparation | Cracking Resistance |
|---|---|---|---|
| Example 5 | 75 | DDVP emulsion | 20 |
| Example 6 | 101 | Hinosan emulsion | 20 |
| Example 7 | 235 | Estox emulsion | 20 |
| Comparative Example 5 | 80 | DDVP emulsion | 2 |
| Comparative Example 6 | 220 | Estox emulsion | 4 |

TABLE 4

| | Oxygen Permeability Constant (cc · cm/cm$^2$ · sec · cmHg) | |
|---|---|---|
| | 0% RH (35° C.) | 100% RH (20° C.) |
| Example 8 | 1.6 × 10$^{-14}$ | 1.0 × 10$^{-13}$ |
| Comparative Example 7 | 1.5 × 10$^{-14}$ | 5.2 × 10$^{-13}$ |

EXAMPLE 9

The procedures of Example 2 were repeated except that the polymerization vessel ethylene pressure was changed to 35 kg/cm$^2$G and vinyltriethoxysilane was used as the silicon-containing olefinically unsaturated monomer at a feeding rate of 100 mg/hr. The obtained copolymer was found to have 0.008 molar % of the vinyltriethoxysilane unit, 72 molar % of the vinyl acetate unit and about 28 molar % of the ethylene unit. A modified EVOH was then obtained according to the procedures of Example 2. The degree of saponification was 99.4 molar %, and the melt index MI$_{210}$ measured at 210° C. under a load of 2,160 g was 0.80 g/10 min.

Said modified EVOH was used by biaxial orientation blow molding to obtain a hollow container of 300 ml in capacity, 30 g in weight and 1 mm in average body thickness. This container was filled with benzyl alcohol in an amount of 75% in filling rate, tightly stoppered, and the permeability of said solvent was measured at 20° C. and 50° C. by the weight method. The results are shown in Table 5.

COMPARATIVE EXAMPLE 8

The procedures of Example 9 were repeated except that the vinyltriethoxysilane in Example 9 was not used, to obtain an EVOH having an ethylene content of 28.2 molar %, a degree of saponification of 99.5 molar % and an MI$_{210}$ of 2.3 g/10 min, from which a hollow container having the same shape and size as that in Example 9 was produced. This was then measured for the permeability to benzyl alcohol under the same conditions as in Example 9, and the results are shown in Table 5.

TABLE 5

| | Permeability to Benzyl Alcohol (g/day) | |
|---|---|---|
| | 20° C. | 50° C. |
| Example 9 | 0.18 | 1.12 |
| Comparative Example 8 | 0.77 | 5.72 |

EXAMPLE 10 AND COMPARATIVE EXAMPLE 9

In a 50-liter polymerization vessel having a stirrer and equipped with a built-in cooling coil, batchwise polymerization was conducted by the following conditions in order to obtain a silicon-containing ethylene-vinyl acetate copolymer.

| | |
|---|---|
| Amount of vinyl acetate charged | 15 kg |
| Amount of methanol charged | 5.8 kg |
| Amount of Vinyltrimethoxysilane charged | 6.4 kg |
| Amount of 2,2'-azobisisobutyronitrile charged | 2.7 g |
| Polymerization temperature | 60° C. |
| Polymerization vessel ethylene pressure | 33 kg/cm$^2$G |
| Polymerization time | 6.5 kg |

The degree of polymerization of the vinyl acetate was 31%. Said copolymer was confirmed by NMR analysis to contain 0.02 molar % of the vinyltrimethoxysilane unit, 68 molar % of the vinyl acetate unit and 32 molar % of the ethylene unit. This was saponified, isolated, then post-treated and dried in a manner similar to that in Example 1 to obtain a modified EVOH. The degree of saponification was 99.5 molar %, and the MI$_{190}$ was 0.55 g/10 min.

By similar procedures but excluding the vinyltrimethoxysilane, an EVOH having an ethylene content of 31.8 molar %, a degree of saponification of 99.6 molar % and an MI$_{190}$ of 5.1 g/10 min was obtained.

The obtained modified EVOH and unmodified EVOH were measured for the oxygen permeability constant under the conditions of 0% RH, 35° C. and 100% RH, 20° C. The results are shown in Table 6.

TABLE 6

| | Oxygen Permeability Constant (cc · cm/cm$^2$ · sec · cmHg) | |
|---|---|---|
| | 0% RH (35° C.) | 100% RH (20° C.) |
| Example 10 | 1.6 × 10$^{-14}$ | 1.2 × 10$^{-13}$ |
| Comparative Example 9 | 1.5 × 10$^{-14}$ | 6.1 × 10$^{-13}$ |

EXAMPLE 11

Using the same polymerization as in Example 1, continuous polymerization was conducted by the following conditions:

| | |
|---|---|
| Feeding rate of vinyl acetate | 400 g/hr |
| Feeding rate of methanol | 100 g/hr |
| Vinyltrimethoxysilane | 240 mg/hr |
| 2,2'-Azobis(2,4-dimethylvaleronitrile) | 170 mg/hr |
| Polymerization temperature | 60° C. |
| Average residence time | 5 hrs |
| Polymerization vessel ethylene pressure | 46 kg/cm$^2$G |

The degree of polymerization of the vinyl acetate was about 45%. Said copolymer was confirmed by NMR analysis to contain 0.023 molar % of the vinyltrimethoxysilane unit, 61 molar % of the vinyl acetate unit and about 39 molar % of the ethylene unit.

This was then saponified, isolated, post-treated and subsequently dried in a manner similar to that in Example 1 to obtain a modified EVOH. The degree of saponification was 99.4 molar %, and the MI$_{190}$ was 1.5 g/10 min.

A five-layered sheet was produced by coextrusion using said EVOH as an intermediate layer, an isotactic polypropylene (density: 0.912) as inner and outer layers, and a maleic anhydride-modified ethylene-vinyl acetate copolymer (vinyl acetate content: 12% by weight; degree of modification with maleic anhydride: 0.5% by weight) as adhesive layers. The coextrusion conditions were as follows:

| | |
|---|---|
| Inner and outer layer metering part temperature | 225° C. |
| Adhesive layer metering part temperature | 190° C. |
| Intermediate EVOH layer metering part temperature | 220° C. |
| Multi-layered die temperature | 215° C. |

The thickness of the extruded five-layered sheet was about 600μ for the inner and outer layers, 80μ for the adhesive layers and 140μ for the intermediate layer. Said sheet was molded by vacuum forming to obtain cups of 77 mm in diameter and 94 mm in height and having a round bottom. The cup molding temperature was 190° C., and the obtained cups had good appearance, showed no unevenly extended part and were free from crack generation.

COMPARATIVE EXAMPLE 10

Using the same polymerization vessel as in Example 1, the polymerization was conducted by the conventional continuous polymerization method in a manner similar to that in Example 11 except that the vinyltrimethoxysilane was not used and the amount of the methanol was reduced, to prepare an EVOH containing 39 molar % of ethylene and having an $MI_{190}$ of 1.5. Thereafter, a five-layered sheet was coextruded in the same manner as in Example 11 and the cups were prepared by the same vacuum forming as in Example 11. As a result, not only unevenness in thickness was found in the bottom of the cup but also scoreline like cracks were generated on the cup.

What is claimed is:

1. A melt molding material which comprises a saponified product of a silicon-containing ethylene-vinyl acetate copolymer, having a degree of saponification of the vinyl acetate component of at least 95 molar %, an ethylene content of 25–55 molar % and a silicon-containing monomer content of 0.0005–0.2 molar % which has been obtained by saponifying a copolymer of vinyl acetate, ethylene and at least one silicon-containing olefinically unsaturated monomer selected from the group consisting of:

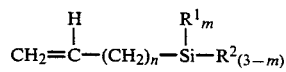  (I)

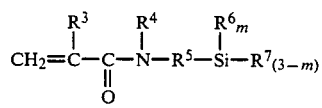  (II)

and

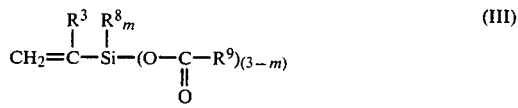  (III)

wherein
n is 0 or 1,
m is 0–2,
$R^1$ is lower alkyl, aryl or lower alkyl having aryl,
$R^2$ is a saturated branched or non-branched alkoxy of 1–40 carbon atoms or a saturated branched or non-branched alkoxy of 1–40 carbon atoms having a substituent containing oxygen,
$R^3$ is hydrogen or methyl,
$R^4$ is hydrogen or lower alkyl,
$R^5$ is alkylene of 1–5 carbon atoms or a divalent organic residue consisting of two chains of 1–5 carbon atoms connected with each other via oxygen or nitrogen,
$R^6$ is hydrogen, halogen, lower alkyl, aryl, or lower aryl having alkyl,
$R^7$ is alkoxy of 1–40 carbon atoms, acyloxy of 1–40 carbon atoms, alkoxy of 1–40 carbon atoms having a substituent containing oxygen or nitrogen, or acyloxy of 1–40 carbon atoms having a substituent containing oxygen or nitrogen,
$R^8$ is hydrogen, halogen, lower alkyl, aryl or lower alkyl having aryl, and
$R^9$ is lower alkyl.

2. The melt molding material according to claim 1 wherein $R^1$ represents lower alkyl of 1–5 carbon atoms, aryl of 6–18 carbon atoms or lower alkyl of 1–5 carbon atoms having aryl of 6–18 carbon atoms, $R^4$ represents hydrogen or lower alkyl of 1–5 carbon atoms, $R^6$ represents hydrogen, halogen, lower alkoxy of 1–5 carbon atoms, aryl of 6–18 carbon atoms or lower alkyl of 1–5 carbon atoms having aryl of 6–18 carbon atoms, $R^8$ represents hydrogen, halogen, lower alkyl of 1–5 carbon atoms, aryl of 6–18 carbon atoms or lower alkyl of 1–5 carbon atoms having aryl of 6–18 carbon atoms, and $R^9$ represents lower alkyl of 1–5 carbon atoms.

3. The melt molding material according to claim 1 wherein the silicon-containing monomer content is 0.001–0.1 molar %.

4. The melt molding material according to claim 1 wherein said melt molding material is a material for deep forming.

5. The melt molding material according to claim 1 wherein the silicon-containing ethylene-vinyl acetate copolymer contains an additional copolymerizable comonomer selected from the group consisting of α-olefins containing at least 3 carbon atoms, acrylic acid, esters of acrylic acid, methacrylic acid and esters of methacrylic acid.

6. A shaped article obtained by melt extruding a saponified product of a silicon-containing ethylene-vinyl acetate copolymer as defined in claim 1.

7. A method of preparing a shaped article comprising melt extruding a saponified product of a silicon-containing ethylene-vinyl acetate copolymer as defined in claim 1.

* * * * *